United States Patent
Chiu et al.

(10) Patent No.: US 10,447,062 B2
(45) Date of Patent: Oct. 15, 2019

(54) METHOD FOR PRODUCING A WIRELESS CHARGING COIL

(71) Applicant: CYNTEC CO., LTD., Hsinchu (TW)

(72) Inventors: Kuan-Yu Chiu, Hsinchu (TW);
Hsieh-Shen Hsieh, Hsinchu (TW);
Sheng-Heng Chung, Hsinchu (TW);
Chien-Tung Lu, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 20 days.

(21) Appl. No.: 15/498,492

(22) Filed: Apr. 27, 2017

(65) Prior Publication Data

US 2017/0317517 A1    Nov. 2, 2017

Related U.S. Application Data

(60) Provisional application No. 62/329,179, filed on Apr. 28, 2016.

(51) Int. Cl.

| | |
|---|---|
| *H01F 7/06* | (2006.01) |
| *H02J 7/02* | (2016.01) |
| *H01F 41/069* | (2016.01) |
| *H01F 41/094* | (2016.01) |
| *H02J 50/10* | (2016.01) |
| *H01F 27/28* | (2006.01) |
| *H01F 5/06* | (2006.01) |
| *H01F 27/32* | (2006.01) |
| *H01F 38/14* | (2006.01) |

(52) U.S. Cl.
CPC ............. *H02J 7/025* (2013.01); *H01F 5/06* (2013.01); *H01F 27/2823* (2013.01); *H01F 27/324* (2013.01); *H01F 38/14* (2013.01); *H01F 41/069* (2016.01); *H01F 41/094* (2016.01); *H02J 50/10* (2016.02)

(58) Field of Classification Search
CPC ...... H01F 5/06; H01F 27/2823; H01F 27/324; H01F 38/14; H01F 41/069; H01F 41/094; H02J 7/025; H02J 50/10
See application file for complete search history.

(56) References Cited

U.S. PATENT DOCUMENTS 4,081,003 A * 3/1978 Checheljuk ........... H01F 41/084
140/92.2

FOREIGN PATENT DOCUMENTS

| CN | 1204881 A | 1/1999 |
|---|---|---|
| CN | 101542656 A | 9/2009 |
| CN | 103366931 A | 10/2013 |
| CN | 203552722 U | 4/2014 |
| CN | 203966822 U | 11/2014 |
| CN | 104756357 A | 7/2015 |

(Continued)

*Primary Examiner* — Paul D Kim
(74) *Attorney, Agent, or Firm* — Winston Hsu

(57) ABSTRACT

A wireless charging coil with a high Q factor includes a plurality of wire groups. Each of the wire groups includes a plurality of wires, a self-bonding film and a plurality of insulation layers. The wires are spun together in a helical manner to form a self-woven structure of the wire group. The self-bonding film surrounds the plurality of wires, and each of the insulation layers covers a surface of a wire. The plurality of wire groups together are wound into a plurality of turns on a same winding surface, and all of the plurality of wire groups are wound on the same winding surface. Each turn is wound by the plurality of wire groups.

17 Claims, 9 Drawing Sheets

(56) References Cited

FOREIGN PATENT DOCUMENTS

| | | |
|---|---|---|
| CN | 204632573 U | 9/2015 |
| JP | 58-166020 | 11/1983 |
| JP | 03166347 A * | 7/1991 |
| JP | 3-248506 | 11/1991 |
| JP | 5-109571 | 4/1993 |
| JP | 11-146610 | 5/1999 |
| TW | 201015592 A1 | 4/2010 |

* cited by examiner

S1

S2

S3

S4

S5

S6

METHOD FOR PRODUCING A WIRELESS CHARGING COIL

CROSS REFERENCE TO RELATED APPLICATIONS

This non-provisional application claims priority of U.S. provisional application No. 62/329,179, filed on Apr. 28, 2016, included herein by reference in its entirety.

BACKGROUND OF THE INVENTION

1. Field of the Invention

This invention is related to a wireless charging coil, and more particularly, a wireless charging coil with a high Q factor.

2. Description of the Related Art

As electricity becomes the main power source of our daily used electronic devices, the wireless charging technology has been widely discussed for its advantage of convenience. One of the popular approaches of the wireless charging technology takes advantage of the principle of near field induction to transmit power through two coupling coils. However, the wireless charging technology has difficulty in expanding its application field due to its low charging efficiency comparing to the traditional wired power transmission.

The Q factor of the wireless charging coil is one of the critical factors affecting the charging efficiency. A higher Q factor corresponds to a lower rate of power loss. The Q factor of the wireless charging coil is related to the resistance and reactance of the wireless charging coil. However, to decrease the resistance of the wireless charging coil and to increase the reactance of the wireless charging coil may require greater and thicker wires, increasing the required area of the wireless charging coil and complicating the manufacturing process.

SUMMARY OF THE INVENTION

One embodiment of the present disclosure discloses a wireless charging coil with a high Q factor. The wireless charging coil includes a plurality of wire groups. Each of the wire groups includes a plurality of wires, a self-bonding film and a plurality of insulation layers. The wires are spun together in a helical manner to form a self-woven structure of the wire group. Each of the insulation layers covers a surface of a wire of the plurality of wires. The self-bonding film surrounds the plurality of wires.

The plurality of wire groups together are wound into a plurality of turns on the same winding surface, all of the plurality of wire groups are wound on the same winding surface, and each turn is wound by the plurality of wire groups.

Another embodiment of the present disclosure discloses a method for producing a wireless charging coil. The method includes providing a plurality of wire groups, fixing first ends of a plurality of wire groups on an active jig of a winding machine, engaging the active jig with a passive jig, the winding machine winding the plurality of wire groups, fixing second ends of the plurality of wire groups, and disengaging the passive jig from the active jig. The active jig and the passive jig have the same spin axis.

Each of the wire groups includes a plurality of wires spun together in a helical manner to form a self-woven structure of the wire group and a self-bonding film surrounding the plurality of wires.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
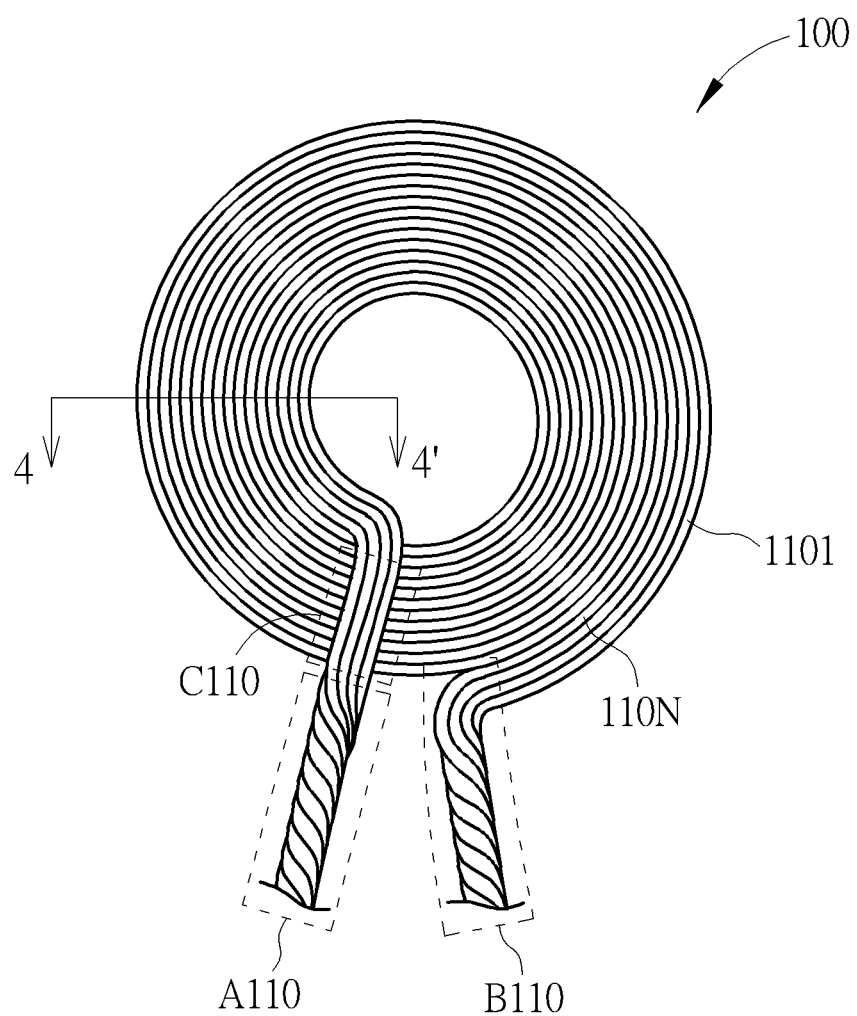
FIG. 1 shows a wireless charging coil according to one embodiment of the present disclosure.

FIG. 1 shows a wireless charging coil 100 according to one embodiment of the present disclosure. The wireless charging coil 100 includes N wire groups 1101 to 110N, where N is an integer greater than 1. The first ends A110 of the wire groups 1101 to 110N can be electrically coupled together, and the second ends B110 of the wire groups 1101 to 110N are electrically coupled together. That is, the wire groups 1101 to 110N are electrically coupled in parallel on the same winding surface.

Figure 2:
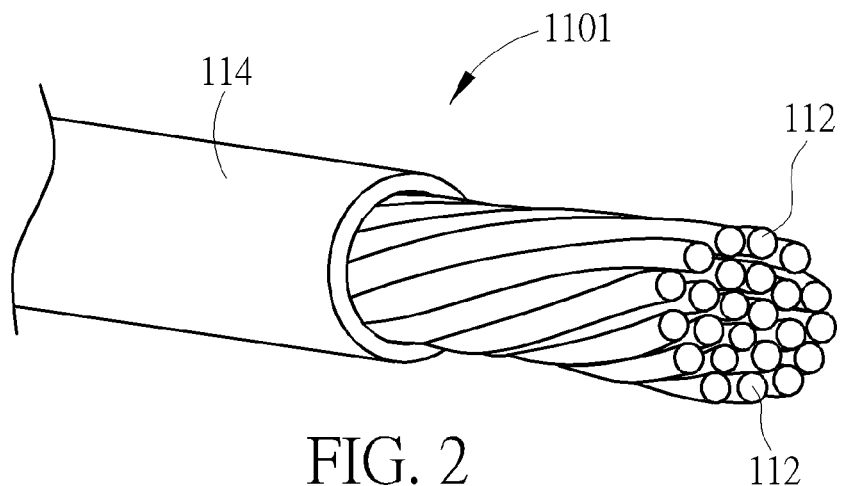
FIG. 2 shows a structure of the wire group in FIG. 1.
Figure 3:
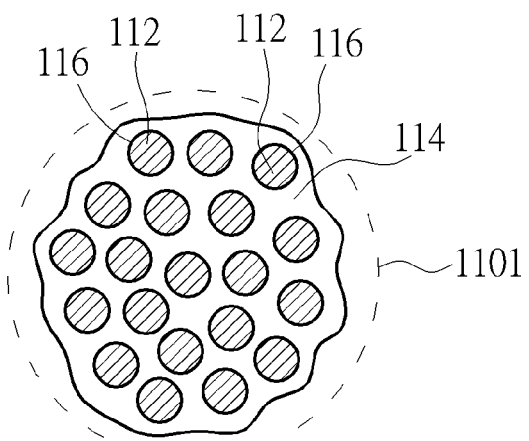
FIG. 3 shows a cross-section of the wire group in FIG. 2.

FIG. 2 shows a structure of the wire group 1101 and FIG. 3 shows a cross-section of the wire group 1101 according to one embodiment of the present disclosure. The N wire groups 1101 to 110N may have similar structures. Each of the wire groups 1101 to 110N includes a plurality of wires 112, a self-bonding film 114 and a plurality of insulation layers 116. In FIG. 2, the plurality of wires 112 are spun together in a helical manner to form a self-woven structure of the wire group 1101. In FIG. 3, each wire 112 is covered by an insulation layer 116, and the self-bonding film 114 surrounds the wires 112 to unify the wires 112. In some embodiments, the plurality wires 112 can be enameled wires.

Figure 4:
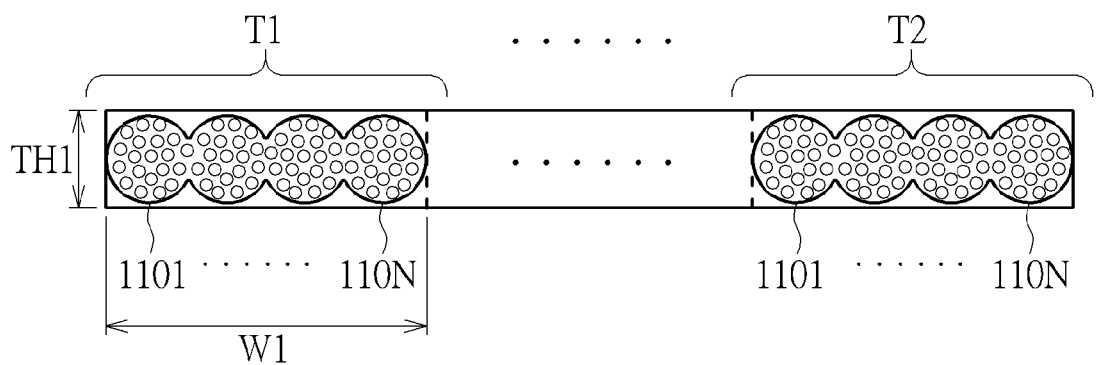
FIG. 4 shows a cross-section of two turns of the wire groups along the cross sectional line 4-4' in FIG. 1.

Furthermore, the wire groups 1101 to 110N together are wound into a plurality of turns on a same winding surface, and all the wire groups 1101 to 110N are wound on the same winding surface. That is, each turn of the wireless charging coil 100 is wound by the plurality of wire groups 1101 to 110N. FIG. 4 shows a cross-section of two turns T1 and T2 of the wire groups 1101 to 110N along the cross sectional line 4-4' in FIG. 1.

In FIG. 4, the two turns T1 and T2 are wound on the same winding surface. Also, the width W1 of the cross-section of the turn T1 to the thickness TH1 of the cross-section of the turn T1 is N:1 (W1:TH1=N:1). That is, the thickness TH1 of the cross-section of the turn T1 may be the diameter of one wire group, while the width W1 of the cross-section of the turn T1 may be substantially equal to N times the diameter of one wire group. Therefore, by increasing the number of wire groups N for one turn, the ratio of width to thickness can be increased.

Since the wire groups 1101 to 110N are electrically coupled in parallel, the flat structure of each turn of the wire groups 1101 to 110N can help to increase the cross-sectional area of each turn for reducing the direct current resistance (DCR) of the wireless charging coil 100 without increasing the thickness of the wireless charging coil 100, making the installment of the wireless charging coil 100 easier with better flexibility. In some embodiments, considering the balance between structure flexibility and the coupling efficiency of the wireless charging coil, the number of N may be chosen from 2 to 10.

Also, the self-woven wires 112 of the wire groups 1101 to 110N can help to reduce the negative influence brought by the skin effect and the proximity effect, decreasing the alternative current resistance (ACR) of the wireless charging coil 100 and increasing the Q factor of the wireless charging coil 100 significantly.

In addition, the first ends A110 of the wire groups 1101 to 110N are extended from the innermost turn of the wire groups 1101 to 110N as shown in FIG. 1. In this case, to keep the flat structure of the wireless charging coil 100, the thickness TH2 of the wire groups 1101 to 110N at a crossing portion C110 crossing from the innermost turn to the outermost turn can be smaller than the thickness TH1 of the wire groups 1101 to 110N wound on the same winding surface.

Figure 11:
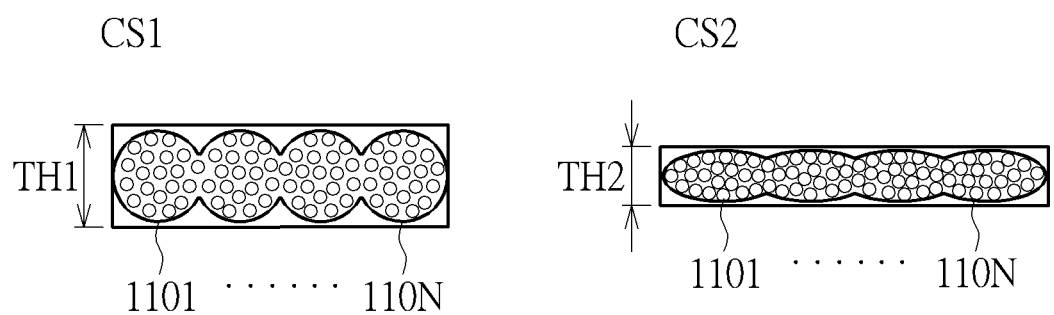
FIG. 11 shows the cross-section of the wire groups at the first ends and the cross-section of the wire groups wound on the same winding surface.

FIG. 11 shows the cross-section CS1 of the wire groups 1101 to 110N wound on the same winding surface and the cross-section CS2 of the crossing portion C110 of the wire groups 1101 to 110N. In FIG. 11, the wire groups 1101 to 110N at the crossing portion C110 are pressed and reformed to be a flatter structure. However, the wire groups 1101 to 110N wound on the same winding surface remain the self-woven structure. Therefore, the thickness TH2 of the wire groups 1101 to 110N at the crossing portion C110 is smaller than the thickness TH1 of the wire groups 1101 to 110N wound on the same winding surface (TH2<TH1).

Figure 5:
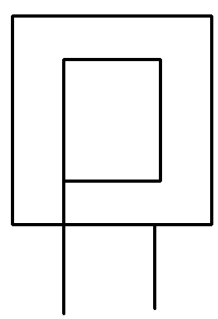
FIG. 5 shows various possible shapes of the wireless charging coil.
Figure 5:
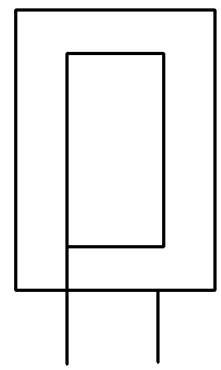
Figure 5:
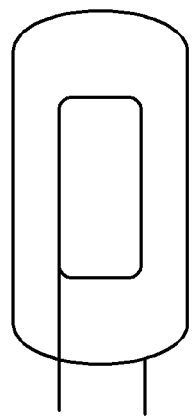
Figure 5:
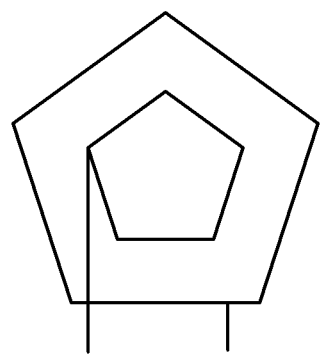
Figure 5:
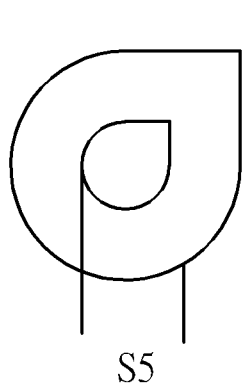
Figure 5:
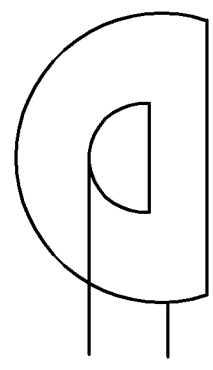

In FIG. 1, the wire groups 1101 to 110N are wound in a circular manner, however, the wireless charging coil of the present disclosure is not limited to be wound into a circle. In some embodiments, the wire groups 1101 to 110N may also be wound into a convex shape according to the system requirement. For example, FIG. 5 shows some of the possible shapes, such as a square S1, a rectangle S2, a racing track shape S3, a polygon S4, and other irregular shapes S5 and S6, of the wireless charging coil 100. The shape of the wireless charging coil 100 can be determined by the shape of the winding center. For example, if the wireless charging coil 100 is wound with respect to a winding center having a shape of square, the shape of the wireless charging coil 100 would be a square.

Figure 6:
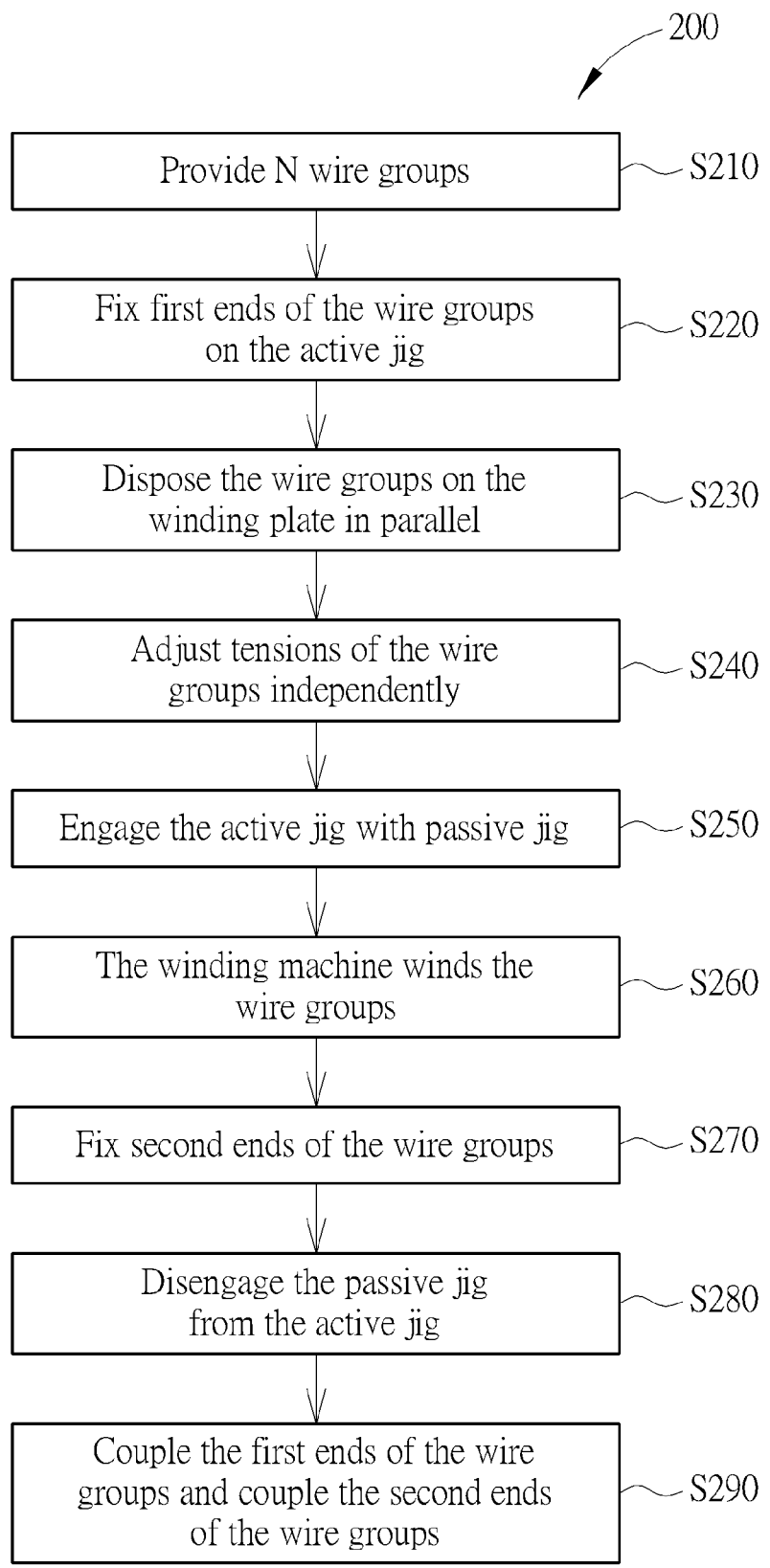
FIG. 6 shows a flow chart of the method for producing the wireless charging coil in FIG. 1.
Figure 7:
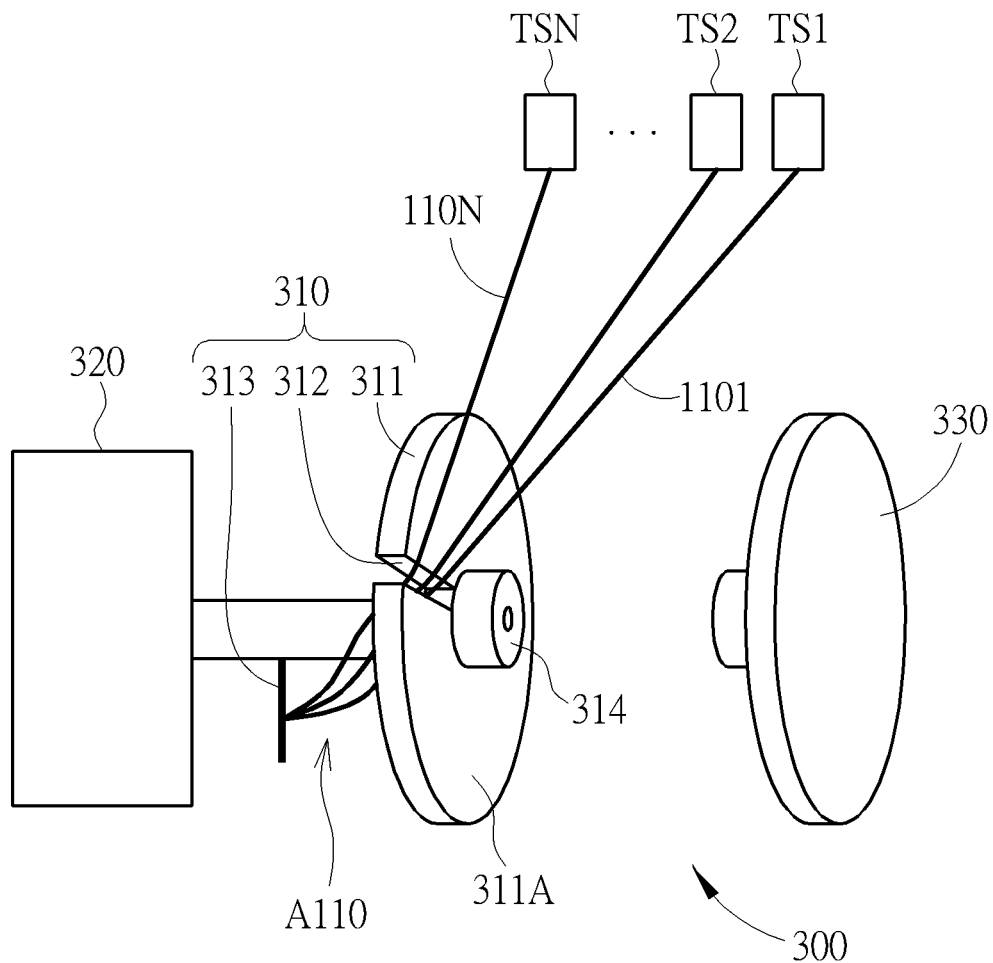
FIG. 7 shows a winding machine used by the method in FIG. 6 according to one embodiment of the present disclosure.

FIG. 6 shows a flow chart of the method 200 for producing the wireless charging coil 100 and FIG. 7 shows a winding machine 300 used by the method 200 for winding the wire groups 1101 to 110N according to one embodiment of the present disclosure.

The winding machine 300 includes an active jig 310 and a winding motor 320. The active jig 310 includes a winding plate 311, a wiring slot 312, and a line hanging structure 313. The winding plate 311 includes a winding surface 311A for disposing the wire groups 1101 to 110N, and the wiring slot 312 is disposed on the winding plate 311 and extends from the center of the winding plate 311 to the periphery of the winding plate 311. In some embodiments, the winding surface 311A can be a plane surface, a convex surface, or a concave surface. The line hanging structure 313 is disposed behind the winding surface 311A of the winding plate 311.

The method 200 includes steps S210 to S290 but is not limited to the sequence below.

S210: provide N wire groups 1101 to 110N;
S220: fix first ends A110 of the wire groups 1101 to 110N on the active jig 310 of the winding machine 300;
S230: dispose the wire groups 1101 to 110N on the winding plate 311 of the active jig 310 in parallel;
S240: adjust tensions of the wire groups 1101 to 110N separately;
S250: engage the active jig 310 with passive jig 330;
S260: the winding machine 300 winds the wire groups 1101 to 110N;
S270: fix second ends B110 of the wire groups 1101 to 110N;
S280: disengage the passive jig 330 from the active jig 310;
S290: couple the first ends of the wire groups 1101 to 110N and couple the second ends of the wire groups 1101 to 110N.

In step S210, each of the N wire groups 1101 to 110N provided in step S210 may have the same structure as the wire group 1101 shown in FIGS. 2 and 3. That is, each of the wire groups 1101 to 110N may include wires 112 spun together in a helical manner to form a self-woven structure, and the self-bonding film 114 surrounding the wires 112.

In step S220, the first ends of the wire groups 1101 to 110N can be fixed to the line hanging structure 313 behind the winding plate 311 through the wiring slot 312. In this case, the wire groups 1101 to 110N can extend through the wiring slot 312 and can be disposed on the winding plate 311 in parallel before the winding machine 300 winds the plurality of wire groups 1101 to 110N in step S260.

Since the wire groups 1101 to 110N may have different winding radii, the tensions of the wire groups 1101 to 110N can be adjusted separately in step S240, ensuring the wireless charging coil 100 being wound smoothly and evenly on the winding plate 311. In some embodiments of the present disclosure, the tensions of the wire groups 1101 to 110N can be adjusted to be substantially equal to one another and the tensions of the wire groups 1101 to 110N can be controlled by different tensioners, pulleys, or damping clamps. For example, in FIG. 7, the tensioners TS1 to TSN are coupled to the second ends of the wire groups 1101 to 110N for controlling the tensions of the wire groups 1101 to 110N.

Figure 8:
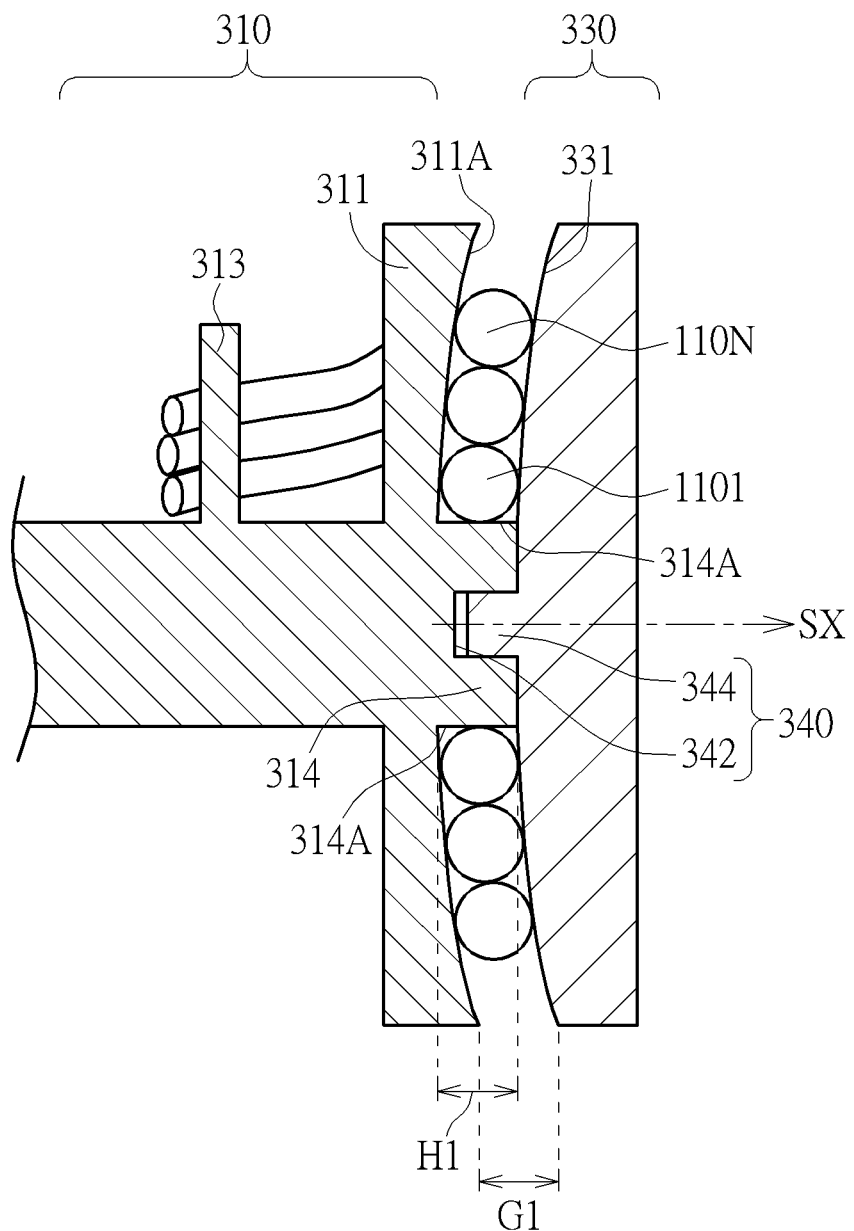
FIG. 8 shows a passive jig and an active jig of the winding machine in FIG. 7.

In addition, to maintain the flat structure of the wireless charging coil 100 during winding, a passive jig 330 may be used to press against the wire groups 1101 to 110N during winding. FIG. 8 shows a cross-section view of the passive jig 330 engaging with the active jig 310.

In FIG. 8, the winding plate 311 of the active jig 310 has a protrusion structure 314 at the center of the winding plate 311, and the height H1 of the protrusion structure 314 can be substantially equal to the diameter of each of the wire groups 1101 to 110N. Also, the passive jig 330 has an engaging surface 331. In FIG. 8, the engaging surface 331 can be a convex surface, and the winding surface 311A of the winding plate 311 can be a concave surface.

In step S250, the active jig 310 can be engaged with passive jig 330 by pressing the passive jig 331 against the protrusion structure 314 of the active jig 310 so as to preserve a gap G1 between the winding plate 311 and the engaging surface 331 of the passive jig 330 for containing the wire groups 1101 to 110N. The gap G1 is substantially equal to the height H1 of the protrusion structure 314. That is, the wire groups 1101 to 110N can be confined within the gap G1 between the winding plate 311 and the engaging surface 331, preventing the wire groups 1101 to 110N from being squeezed and overlapped with each other during the winding process. Consequently, in step S260, when the winding machine 300 winds the wire groups 1101 to 110N, the thickness of the wireless charging coil 100 would be fixed by the gap G1.

In some embodiments, the winding motor 320 can drive the active jig 310 to spin, so the wire groups 1101 to 110N fixed on the line hanging structure 313 through the wiring slot 312 can be wound with respect to the winding portion 314A of the protrusion structure 314. Furthermore, although the winding motor 320 may not drive the passive jig 330 directly, the passive jig 330 may also spin as the active jig 310 due to the friction between the passive jig 330 and the wire groups 1101 to 110N when the winding motor 320 spins the active jig 310 to wind the wire groups 1101 to 110N. That is, the passive jig 330 and the active jig 310 may have different spinning speeds when the winding machine 300 winds the plurality of wire groups 1101 to 110N.

To ensure that the active jig 310 can be pressed against the passive jig 330 with a strong force to maintain the flat structure of the wireless charging coil 100 without disturbing the motion of the active jig 310 and the winding motor 320, the active jig 310 and the passive jig 330 may be designed to engage along the spin axis SX of the active jig 310 and avoid damaging the corners of the winding portion 314A of the protrusion structure 314.

For example, in FIG. 8, the active jig 310 and the passive jig 330 can be engaged with a set of engaging structures 340. The set of engaging structures 340 includes an opening 342 disposed at the center of the protrusion structure 314, and a bulge 344 for inserting into the opening 342 of the protrusion structure 314 when the active jig 310 engages with the passive jig 330. In FIG. 8, the bulge 344 is disposed at the center of the engaging surface 331.

Also, the diameter of the set of engaging structures 340, for example, the diameter of the bulge 344 or the diameter of the opening 342, is smaller than the diameter of the protrusion structure 314.

In this case, when the winding motor 320 drives the active jig 310 to spin, the passive jig 330 may also spin with the active jig 310 because the spin axis SX of the active jig 310 and the passive jig 330 is along the center of the active jig 310 and the center of the passive jig 330. Consequently, when winding the wire groups 1101 to 110N in step S260, the active jig 310 can engage with the passive jig 330 to confine the structure of the wireless charging coil 100 without disturbing the spinning of the active jig 310 and the winding of the wire groups 1101 to 110N.

In addition, since the wire groups 1101 to 110N are wound with respect to the winding portion 314A of the protrusion structure 314 while the bulge 344 is inserted to the opening 342, the wearing out of the opening 342 or the bulge 344 caused by long-time usage will not affect the winding portion 314A of the protrusion structure 314, the winding surface 311A of the wiring plate 311, and the engaging surface 331, preventing the structure of the wireless charging coil from being distorted by the aging active jig 310 or the aging passive jig 330.

Figure 9:
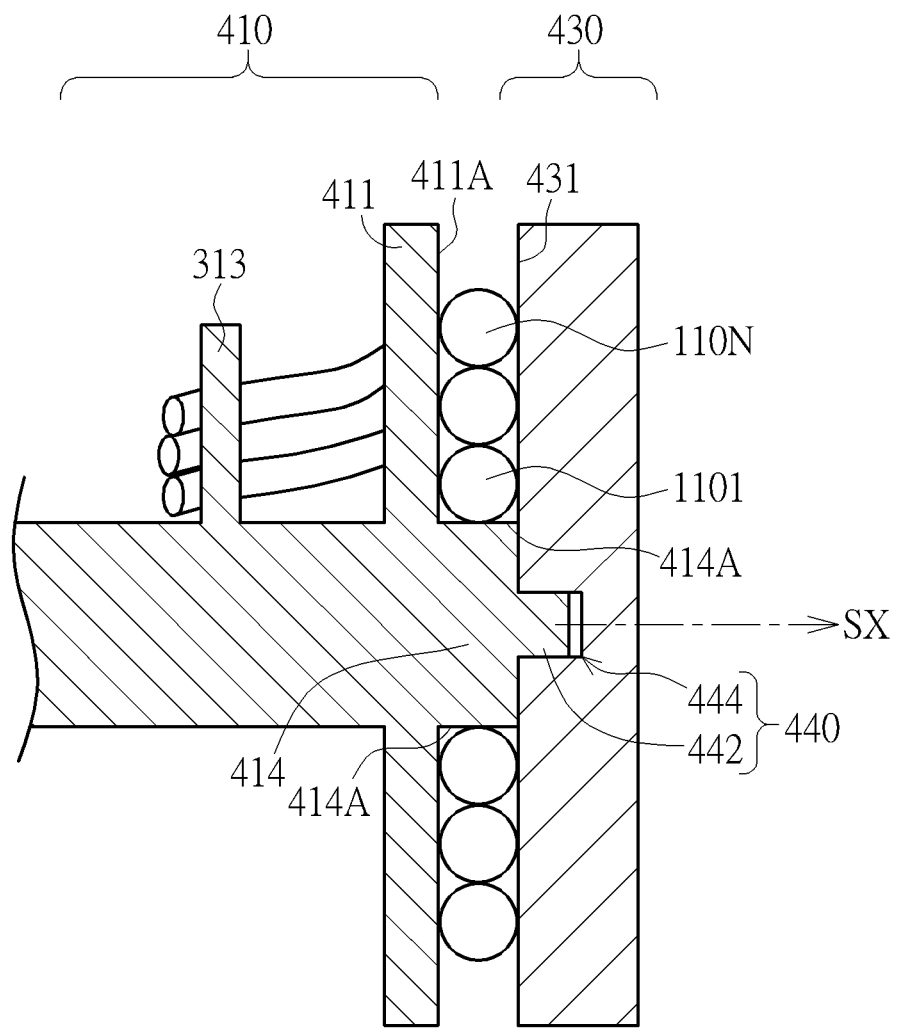
FIG. 9 shows an active jig and a passive jig according to another embodiment of the present disclosure.

FIG. 9 shows an active jig 410 and a passive jig 430 according to another embodiment of the present disclosure. The active jig 410 has a similar structure as the active jig 310; however, the set of engaging structure 440 includes a bulge 442 protruded from the center of the protrusion structure 414, and an opening 444 is disposed at the center of the engaging surface 431 of the passive jig 430. Therefore, when engaging the active jig 410 with the passive jig 430, the bulge 442 protruded from the protrusion structure 414 can be inserted into the opening 444 on the engaging surface 431. Also, the diameter of the bulge 442 is smaller than the diameter of the protrusion structure 414.

In this case, when the active jig 410 starts to spin, the passive jig 430 may also spin as the active jig 410 while the spin axis SX of the active jig 410 and the passive jig 430 is extended along the center of the active jig 410 and the center of the passive jig 430. Consequently, when winding the wire groups 1101 to 110N in step S260, the passive jig 430 can be engaged to the active jig 410 to confine the structure the wireless charging coil 100 without disturbing the spinning of the active jig 410 and the winding of the wire groups 1101 to 110N.

Although the protrusion structures 314 and 414 are extended from the center of the winding plates 311 and 411 in FIGS. 8 and 9 respectively, the protrusion structure may also be extended from the center of the engaging surface of the passive jig in some embodiments. In this case, the set of engaging structures may include an opening disposed at the center of the protrusion structure and the bulge disposed at the center of the winding plate. Or, the opening may be disposed at the center of the winding plate and the bulge may be disposed at the center of the protrusion surface.

In addition, since the wire groups 1101 to 110N are wound with respect to the winding portion 414A of the protrusion structure 414 while the bulge 442 is inserted to the opening 444, the wearing out of the opening 444 or the bulge 442 caused by long-time usage will not affect the winding portion 414A of the protrusion structure 414, the winding surface 411A of the wiring plate 411 and the engaging surface 431, preventing the structure of the wireless charging coil from being distorted by the aging active jig 410 or the aging passive jig 430.

In FIG. 8, since the wire groups 1101 to 110N are wound with respect to the winding portion 314A of the protrusion structure 314, the shape of the winding portion 314A of the protrusion structure 314 may decide the shape of the wireless charging coil 100. However, if the wire groups 1101 to 110N are to be wound into a shape with vertices, the wire groups 1101 to 110N may endure greater stress at the vertices during winding. Therefore, the winding machine 300 may adjust the winding speed according to the characteristics of the desired winding shape.

Figure 10:
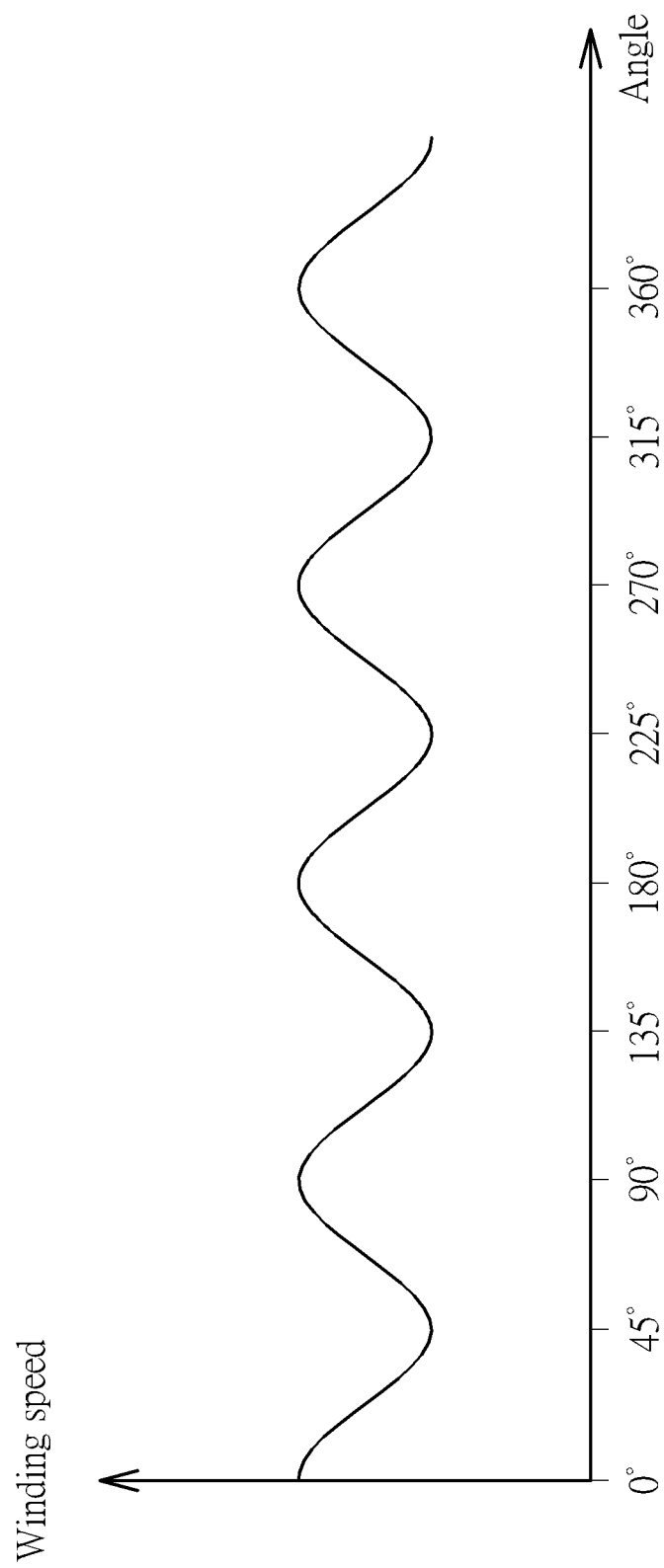
FIG. 10 shows the winding speed when the winding shape of the wire groups in FIG. 1 is a square.

For example, when the desired winding shape of the wireless charging coil is a square, a rectangle, or a polygon such as shown in FIG. 5, the winding machine 300 may decrease the winding speed when winding the wire groups 1101 to 110N on a vertex of the winding portion of the protrusion structure, and may increase the winding speed when winding the wire groups 1101 to 110N on an smooth edge of the winding portion of the protrusion structure. Therefore, the wire groups 1101 to 110N at the vertices can be wound slower, preventing damages. FIG. 10 shows the winding speed when the shape of the winding portion of the protrusion structure is the square S1 or the wireless charging coil is the square S1. In FIG. 10, when the winding machine 300 winds the wire groups 1101 to 110N on the vertex of the square S1 at the angle of 45°, 135°, 225°, and 315°, the winding speed is the lowest. Also, when the winding machine 300 winds the wire groups 1101 to 110N on the smooth edge of the square at the angle of 90°, 180°, 270°, and 360°, the winding speed is the highest.

After the wire groups 1101 to 110N are wound in step S260, the second ends of the wire groups 1101 to 110N can be fixed on the active jig 310 of the winding machine 300 and the passive jig 330 can be disengaged from the active jig 310 in steps S270 and S280.

In some embodiments, to reinforce the structure of the wireless charging coil 100, the method 200 may further include a step for bonding the wire groups 1101 to 110N before removing the passive jig 330. For example, each of the wire groups 1101 to 110N may further include a self-bonding film covering outside of its insulating layer 116. The self-bonding film may become adhesive through some specific processes, so the wire groups 1101 to 110N can be bonded to form a solid structure of the wireless charging coil 100. For example, the self-bonding film may become adhesive by blowing hot air to the wire groups 1101 to 110N, inputting currents to the wire groups 1101 to 110N to heat the self-bonding film, and/or spraying solvent on the self-bonding film. In addition, the hot air bonding, heat resistance bonding and/or solvent bonding as the aforementioned bonding process can be performed after the wire groups 1101 to 110N are wound or during the winding of the wire groups 1101 to 110N. In addition, once the wire groups 1101 to 110N are bonded, a solidification process may be performed by cooling the wire groups 1101 to 110N, further heating the wire groups 1101 to 110N and/or emitting ultraviolet (UV) light on the wire groups 1101 to 110N to solidify the adhesive material.

After the bonding process, some of the adhesive material may be attached to the passive jig 330 or the active jig 310. Therefore, the structure of the wireless charging coil 100 may be distorted if the passive jig 330 is disengaged directly without care. In this case, the passive jig 330 can be disengaged by making the passive jig 330 and the active jig 310 spin with different spinning speeds with one or two winding motors. For example, one may spin only one or both of the passive jig 330 and the active jig 310 to relieve the adhesion between the wire groups 1101 to 110N and the passive jig 330 first (or between the wire groups 1101 to 110N and the active jig 310), and then remove the passive jig 330. Consequently, the wireless charging coil 100 can retain its structure during the disengaging process in step S280.

Once the passive jig 330 is disengaged, the wireless charging coil 100 can be released. In some embodiments of the present disclosure, the winding plate 311 can be removable from the active jig 310. Therefore, by dismounting the winding plate 311 from the active jig 310, the wireless charging coil 100 can be released easily.

In step S290, the first ends of the wire groups 1101 to 110N would be electrically coupled together and the second ends of the wire groups 1101 to 110N would be electrically coupled together so that the wire groups 1101 to 110N can be electrically coupled in parallel.

Consequently, according to the method 200, the wireless charging coil 100 with a high Q factor can be manufactured. Also, the flat structure of the wireless charging coil 100 can not only reduce the DC resistance but can also provide flexibility to the design with the wireless charging coil 100.

In summary, wireless charging coil and the method for producing the wireless charging coil provided by the embodiments of the present disclosure can reduce the negative influence brought by the skin effect and the proximity effect and decrease DC resistance, improving the Q factor of the wireless charging coil significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for producing a wireless charging coil comprising:
   providing a plurality of wire groups, each wire group comprising a plurality of wires spun together in a helical manner to form a self-woven structure of the wire group and a self-bonding film surrounding the plurality of wires;
   fixing first ends of a plurality of wire groups on an active jig of a winding machine;
   engaging the active jig with a passive jig, wherein the active jig and the passive jig have a same spin axis;
   winding the plurality of wire groups on a winding surface between the active jig and the passive jig, wherein the winding surface extends outward from the spin axis, and the plurality of wire groups are wound outward from the spin axis on the winding surface; and
   disengaging the passive jig from the active jig.

2. The method of claim 1, further comprising adjusting tensions of the plurality of wire groups separately.

3. The method of claim 2, wherein adjusting the tensions of the plurality of wire groups separately comprises adjusting the tensions of the plurality of wire groups by a plurality of tensioners, a plurality of pulleys, or a plurality of damping clamps.

4. The method of claim 1, further comprising:
   adjusting a winding speed of the winding machine according to characteristics of a winding shape of the plurality of wire groups;
   wherein the winding speed of the winding machine when winding the plurality of wire groups on a vertex of the winding shape is smaller than the winding speed of the winding machine when winding the plurality of wire groups on an smooth edge of the winding shape.

5. The method of claim 1, further comprising bonding the plurality of wire groups before removing the passive jig.

6. The method of claim 5, wherein bonding the plurality of wire groups is performed by hot air bonding, heat resistance bonding and/or solvent bonding the plurality of wires.

7. The method of claim 1, further comprising:
   disposing the plurality of wire groups on a winding plate of the active jig in parallel before the winding machine winds the plurality of wire groups;
   wherein:
   engaging the active jig with the passive jig comprises pressing the passive jig against the active jig while preserving a gap between the winding surface of the winding plate and an engaging surface of the passive jig for containing the plurality of wire groups by a protrusion structure;
   the active jig and the passive jig are engaged with a set of engaging structures; and
   a diameter of the set of engaging structures is smaller than a diameter of the protrusion structure.

8. The method of claim 7, wherein:
   the protrusion structure is extended from a center of the winding plate of the active jig;
   the set of engaging structures comprises an opening and a bulge for inserting into the opening when engaging the active jig with the passive jig;

the opening is disposed at a center of the engaging surface and the bulge disposed at a center of the protrusion structure, or the opening is disposed at the center of the protrusion structure and the bulge disposed at the center of the engaging surface; and a height of the protrusion structure is substantially equal to a diameter of each of the plurality of wire groups.

9. The method of claim 7, wherein:

the protrusion structure is extended from a center of the engaging surface of the passive jig;

the set of engaging structures comprises an opening and a bulge for inserting into the opening when engaging the active jig with the passive jig;

the opening is disposed at a center of the protrusion structure and the bulge disposed at a center of the winding plate, or the opening is disposed at the center of the winding plate and the bulge disposed at the center of the protrusion surface; and a height of the protrusion structure is substantially equal to a diameter of each of the plurality of wire groups.

10. The method of claim 7, wherein:

the active jig further comprises a wiring slot disposed on the winding surface of the winding plate of the active jig, extending from a center of the winding plate to an periphery of the winding plate, and overlapping with a winding area of the winding surface; and fixing the first ends of the plurality of wire groups on the active jig of the winding machine is fixing the first ends of the plurality of wire groups at a line hanging structure behind the winding plate through the wiring slot.

11. The method of claim 10, wherein the wiring slot extends from an edge of the protrusion structure near the spin axis to an edge of the winding plate.

12. The method of claim 1, wherein disengaging the passive jig from the active jig comprises making the passive jig and the active jig have different spinning speeds.

13. The method of claim 12, wherein making the passive jig and the active jig have different spinning speeds is performed by spinning one or both of the passive jig and the active jig.

14. The method of claim 1, wherein the passive jig and the active jig have different spinning speeds when the winding machine winds the plurality of wire groups.

15. The method of claim 1, further comprising coupling the first ends of the plurality of wire groups and coupling second ends of the plurality of wire groups, wherein the plurality of wire groups are electrically coupled in parallel.

16. The method of claim 1, wherein the plurality of wire groups are wound together into a plurality of turns on a same winding surface, all of the plurality of wire groups are wound on the same winding surface, and each turn is wound by the plurality of wire groups.

17. The method of claim 1, further comprising:

fixing second ends of the plurality of wire groups on the active jig of the winding machine or tensioners.

* * * * *